US012719931B2

(12) United States Patent
Bertiger et al.

(10) Patent No.: US 12,719,931 B2
(45) **Date of Patent: *Aug. 25, 2026**

(54) ORDERING SECURITY INCIDENTS USING ALERT DIVERSITY

(71) Applicant: Microsoft Technology Licensing, LLC, Redmond, WA (US)

(72) Inventors: Anna Swanson Bertiger, Seattle, WA (US); Michael Steven Flowers, Kent, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

This patent is subject to a terminal disclaimer.

(21) Appl. No.: 18/638,282

(22) Filed: Apr. 17, 2024

(65) Prior Publication Data

US 2024/0297904 A1 Sep. 5, 2024

Related U.S. Application Data

(63) Continuation of application No. 17/147,749, filed on Jan. 13, 2021, now Pat. No. 11,997,140.

(51) Int. Cl.

| | |
|---|---|
| ***H04L 9/40*** | (2022.01) |
| ***H04L 41/0681*** | (2022.01) |
| ***H04L 41/0686*** | (2022.01) |

(52) U.S. Cl.

CPC .......... *H04L 63/20* (2013.01); *H04L 41/0681* (2013.01); *H04L 41/0686* (2013.01); *H04L 63/0245* (2013.01)

(58) Field of Classification Search

CPC . H04L 63/20; H04L 41/0681; H04L 41/0686; H04L 63/0245

See application file for complete search history.

(56) References Cited

U.S. PATENT DOCUMENTS

| | | | | |
|---|---|---|---|---|
| 11,997,140 | B2 * | 5/2024 | Bertiger | H04L 63/1425 |
| 2016/0226905 | A1 * | 8/2016 | Baikalov | H04L 63/1433 |

OTHER PUBLICATIONS

The Microsoft Press Store (Using Security Center for incident response, Aug. 23, 2018, 16 pages) (Year: 2018).*

Heard et al. (Choosing Between Methods of Combining p-values, arXiv:1707.06897v4 [stat. ME] Dec. 14, 2017, 13 pages) (Year: 2017).*

(Continued)

*Primary Examiner* — Oleg Korsak

(74) *Attorney, Agent, or Firm* — Schwegman Lundberg & Woessner, P.A.

(57) ABSTRACT

In a computer network monitored for security threats, security incidents corresponding to groups of mutually related security alerts may be ranked based on values of a diversity metric computed for each incident from attribute values of an attribute, or multiple attributes, associated with the security alerts. In some embodiments, values of attribute-specific sub-metrics are determined for each incident and combined, e.g., upon conversion to p-values, into respective values of the overall diversity metric. Based on the ranking, an output may be generated. For example, a ranked list of the security incidents (or a subset thereof) may be communicated to a security administrator, and/or may trigger an automated mitigating action.

20 Claims, 4 Drawing Sheets

(56) References Cited

OTHER PUBLICATIONS

Communication under Rule 71(3) EPC Received for European Application No. 21831429.2, mailed on Oct. 21, 2025, 07 pages.

Decision to grant a European patent pursuant to Article 97(1) received in European Application No. 21831429.2, mailed on Mar. 5, 2026, 2 pages.

* cited by examiner

ORDERING SECURITY INCIDENTS USING ALERT DIVERSITY

CLAIM OF PRIORITY

This Application is a Continuation of U.S. application Ser. No. 17/147,749, filed Jan. 13, 2021, which is hereby incorporated by reference in its entirety.

BACKGROUND

Commercial enterprises and other organizations that operate large computer networks typically employ a number of hardware- or software-based network security tools to guard against cybersecurity threats. These network security tools, which may include, e.g., firewalls, anti-malware software, access controls, intrusion prevention systems, network anomaly detectors, email security, and the like, usually generate security alerts when triggered by anomalous or otherwise suspicious activity. Logs of such security alerts, often aggregated over the various tools, can be reviewed by network security analysists or administrators, who then assess whether a security threat is indeed present and take appropriate action. As the number of alerts can be far in excess of the amount that human network security administrators can handle—e.g., running into the tens or hundreds of thousands or even millions per day for a sizable organization—a network security solution may involve some form of clustering or grouping of the alerts, e.g., based on similarity between their attributes, into security incidents each deemed to correspond to a single cyberattack that affects many machines, users, applications, transactions, etc. In addition, human action on security incidents or alerts may be augmented with, or in some cases even obviated by, automated machine action taken to mitigate threats. Even with aggregation of alerts into far fewer incidents and optional automation of mitigating actions, however, the number of incidents (e.g., in the hundreds or thousands per day) may still consume substantial machine resources and/or be overwhelming to human administrators. In addition, the security incidents may include many false positives that unnecessarily trigger machine action and/or distract administrators from the true threats, rendering the network vulnerable to attacks.

BRIEF DESCRIPTION OF FIGURES

Various embodiments that address the above-mentioned problem are herein described with reference to the accompanying drawings, in which.

DETAILED DESCRIPTION

Figure 1:
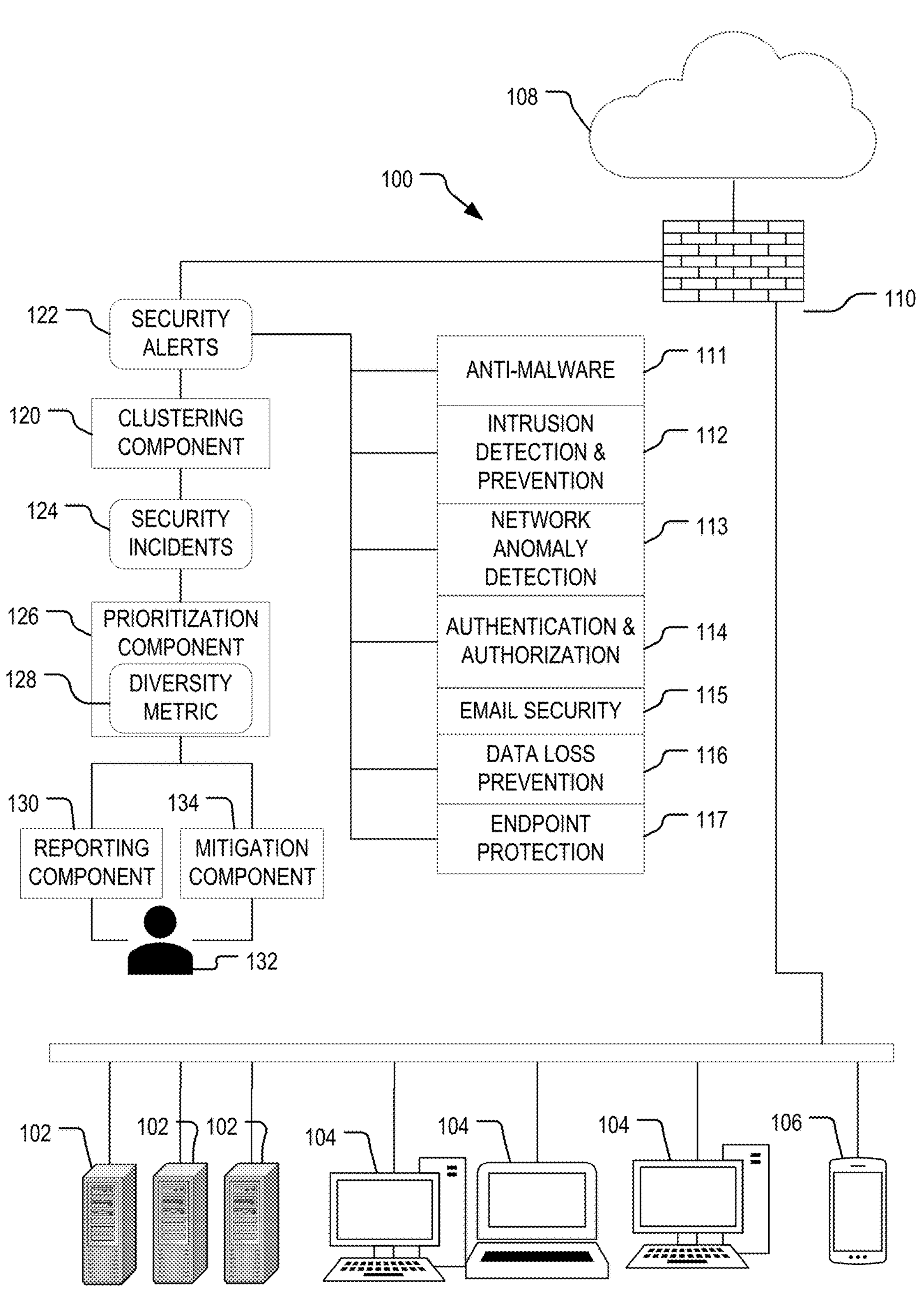
FIG. 1 is a block diagram of an example computer network employing network security tools, in accordance with various embodiments.

Described herein is an approach to prioritizing security incidents, that is, groups of security alerts determined to be related, based on the notion of "diversity" of the alerts within each incident. The underlying heuristic is that incidents whose constituent alerts are of a wider range of alert types, affect a larger number of users or machines, originate from a greater number of security tools, involve a higher number of stages within the "kill chain" (explained below) of a cyberattack, and/or are more diverse according to any other attribute of the alerts, tend to be the more wide-ranging or devastating threats, and thus the more important incidents to trigger automated mitigating action and/or be escalated to a human security administrator or analyst (herein used synonymously). In various embodiments, a diversity metric, representing a measure of the degree of security alert diversity, is computed for each security incident based on attributes associated with the security alerts within the incident, and the incidents are then ranked based on the computed values of the diversity metric. The ranked security incidents, or a subset corresponding to the highest-ranking incidents, can then trigger automated mitigating actions based on the rankings, such as, e.g., shutting down user access to an affected part of the computer network for the highest-ranking incidents, to give but one example. Alternatively or additionally, the ranked incidents or subset of highest-ranking incidents may be communicated (e.g., displayed on screen) to a security administrator, who may work through the list starting with the presumably greatest threat at the top.

In accordance herewith, diversity is not measured, or not measured only, by a simple count of the number of different values that a given attribute takes for the alerts associated with an incident. Rather, the diversity metric includes a more complex measure of diversity for at least one of the attributes. Such complex measure may be, for instance, the Shannon entropy, which captures how compressible the data representing the security alerts is, where greater entropy corresponds to lower compressibility. Other entropy or compressibility measures known in the field of information theory, such as, e.g., Renyi entropy (a generalization of Shannon entropy) or Kolmogorov complexity, may also be used. Further, certain measures commonly used to quantify biodiversity, such as the Simpson index or Berger-Parker index and others, may also be applied or adapted for use to the measurement of alert diversity within a security incident. Such entropy and similar complex measures may be used, in some embodiments, in conjunction with straight counts like, e.g., the number of machines affected within an incident, or the number of machines for which a specific, carefully chosen alert was issued.

Security alerts are represented in a computer system by data structures that generally have multiple associated attributes, including, without limitation, an alert title reflecting a type of alert, a stage within the kill chain of a cyberattack, a source of the alert (e.g., a particular network security tool or suite of tools), identifiers of involved user accounts or machines (e.g., separated by source and destination), or subsets of the foregoing. In various embodiments, an overall diversity metric is computed for a security incidents based on attribute-specific sub-metrics determined for one or more of the attributes (e.g., a sub-metric for titles, a sub-metric for machines, etc.), at least one of the sub-metrics being or including a complex diversity measure such as, for instance, entropy. The sub-metrics for multiple attributes can be combined into the overall diversity metric for an incident, for instance, by converting the value of each sub-metric into a p-value based on a modeled or empirically determined statistical distribution of the sub-metric, and then combining the p-values (e.g., using a weighted average of the p-values or the logarithm of the p-values, using Stouffer's method, or in some other way). A "p-value" for a given value of the sub-metric is herein understood, consistently with the usage of the term in statistics, as the statistical probability, given the statistical distribution of the sub-metric, that the sub-metric equals or exceeds the given value.

The proposed approach to prioritizing security incidents does not require large amounts of metadata about alerts, such as severity or true positive rate. Severity is conventionally often determined by a human expert for individual alerts, and inherited by the incident, whose severity may be taken, e.g., to be the maximum severity of any of its constituent alerts. This assessment of severity is, however, often inadequate in context. For example, alerts that are individually only of medium severity may, collectively and/or in conjunction with other indicators, form an incident of high severity and priority. The diversity-based approach described herein inherently captures this relation. Further, estimating true positive rates generally relies on collecting a lot of expensive data over time to model the likelihood of true positives, and is difficult for individual alerts, let alone for entire incidents. The present approach need not involve such data-intense estimation of true positives. Instead, as noted, it makes use of the insight that the most interesting incidents are the most sprawling and diverse in terms of their attributes to compute diversity metrics that allow for a meaningful ranking of incidents, alleviating the burden associated with indiscriminate lists of large numbers of security incidents. Severity can be assessed, in the proposed diversity-based approach, based on the ranking. For example, incidents within the top 20% of the ranked incidents may be considered as high-severity.

Beneficially, prioritizing (e.g., ranking and/or filtering) security incidents based on diversity in accordance herewith improves the efficiency of machine resources allocation in handling security threats (e.g., by prioritizing the most important incidents when allocating computational processing capacity, memory, and/or network bandwidth), increases the impact of time spent by human security administrators in following up on identified incidents, or both.

The foregoing will be more readily understood from the following description of various example embodiments, in particular, when taken in conjunction with the drawings.

FIG. 1 is a block diagram of an example computer network 100 employing network security tools, in accordance with various embodiments. The computer network 100 may be, e.g., the intranet of an organization, or part of an intranet associated with one among multiple geographically distributed offices. In general, the computer network 100 includes multiple (e.g., often a large number of) computing machines 102, 104, 106, which communicate with each other as well as with machines outside the organization via suitable wired or wireless network connections. In some embodiments, internal communications within the computer network 100 take place via a local area network (LAN) implemented, e.g., by Ethernet or Wi-Fi, or via a private wide area network (WAN) implemented, e.g., via optical fiber or circuit-switched telephone lines. External communications may be facilitated via the Internet 108. The computing machines 102, 104, 106 within the computer network 100 may include, e.g., servers 102, desktop or laptop computers 104, mobile devices (e.g., smartphones 106, tablets, personal digital assistants (PDAs)), Internet-of-things devices, etc. The computer network 100 may be dynamic in that it includes, in addition to computing machines that are permanent parts of the computer network 100 (e.g., servers 102), also computing machines that are only temporarily connected to the computer network 100 at a given time (e.g., if a member of an organization, such as an employee of a company, accesses the intranet of the organization from outside the office via a personal device, such as a smartphone 106). The computing devices 102, 104, 106 may each include one or more (e.g., general-purpose) processors and associated memory; an example computing machine is described in more detail below with reference to FIG. 4.

To protect the computer network 100 from unauthorized access, data theft, malware attacks, or other cyberattacks, the network 100 includes a number of network security tools, which may be software tools running on general-purpose computing hardware (including, e.g., any of the computing machines 102, 104, or a virtual machine) and/or dedicated, special-purpose hardware security appliances. Non-limiting examples of security tools that may be utilized in the computer network 100 include: one or more firewalls 110 that monitor and control network traffic, e.g., via packet filtering according to predetermined rules, establishing a barrier between the computer network 100 and the Internet 108, and optionally between various sub-networks of the computer network 100; anti-malware software 111 to detect and prevent and/or remove malware such as computer viruses, worms, Trojan horses, ransomware, spyware, etc.; intrusion detection and prevention systems 112 that scan network traffic to identify and block attacks (e.g., by comparing network activity against known attack signatures); network anomaly detectors 113 to spot malicious network behavior; authentication and authorization systems 114 to identify users (e.g., by multi-factor authentication) and implement access controls; application security tools to find and fix vulnerabilities in software applications; email security tools 115 to detect and block email-born threats like malware, phishing attempts, and spam; data loss prevention software 116 to detect and prevent data breaches by monitoring sensitive data in storage, in network traffic, and in use; and/or endpoint protection systems 117, which employ a combination of measures to safeguard data and processes associated with the individual computing machines 102, 104, 106 serving as entry points into the network 100.

In some embodiments, comprehensive protection is provided by multiple security tools bundled into an integrated security suite. Sometimes, multiple such integrated security suites from different vendors are even used in combination for complementary protection. Security solutions may employ "security information and events management (SIEM)" to collect, analyze, and report security alerts across the different security products (e.g., different security tools or integrated security suites, e.g., including any or all of tools 110-117), e.g., to provide security analysists with aggregate information in a console view or other unified format. Further, to meet the growing complexity and sophistication of cyberattacks, a more recently developed approach that has come to be known in the art as "extended detection and response (XDR)" may perform intelligent automated analysis and correlation of security alerts across security layers (e.g., email, endpoint, server, cloud, network) to discern cyberattacks even in situations where they would be difficult to detect with individual security tools or SIEM. One nonlimiting example of an XDR product is Microsoft 365 Defender.

With renewed reference to FIG. 1, in various embodiments, the computer network 100 includes, e.g., as part of an SIEM or XDR product, a clustering component 120 that groups security alerts 122 into security incidents 124, a prioritization component 126 that evaluates a diversity metric 128 (optionally comprising multiple sub-metrics) for each security incident 124 and ranks incidents 124 based on their values of the diversity metric 128, a reporting component 130 that communicates the incidents to users 132 such as security analysts and administrators, and a mitigation component 134 that takes action, automatically or responsive to a user 132, to thwart cyberattacks and/or repair damage already suffered in an ongoing or completed attack. These components 120, 126, 130, 134 may be implemented, e.g., as software modules executed by a general-purpose processor, or using some other suitable combination of hardware, firmware, and/or software.

The purpose of the clustering component 120 is to identify groups of security alerts 122 that all relate to the same cyberattack and should therefore be treated collectively as a single incident 124. For example, a malware attack may be carried out through a malicious email attachment sent to multiple users, and each such email may trigger a corresponding security alert, as may any user action to save or execute the attachment as well as various network activities that result from such execution; all of these alerts belong to a single incident. As another example, a data theft may involve multiple stages, beginning with an initial unauthorized access (e.g., via use of a "Golden Ticket," referring to a special authentication token that gives a potential attacker unrestricted usage to an entire domain) and ultimately resulting in the transfer of data to destinations outside the computer network 100; along the way, multiple security alerts may be issued, all associated with the same attack.

In general, a cyberattack proceeds through a sequence of stages in the "cyber kill chain," which may include, for example: reconnaissance, during which the attacker gathers information about the targeted organization and the network security mechanisms in place to identify weaknesses that can be exploited to gain access to the organization's computer network (e.g., harvesting login information or user information useful for phishing); initial access or infiltration, during which the attacker gains unauthorized access to the computer network, whether by exploiting vulnerabilities in the system hardware and/or software via machine-based attacks or taking advantage of human judgment errors in human-based attacks (e.g., to phish for user credentials, or prompt users to inadvertently install malware); lateral movement, during which the attacker, following the initial penetration, moves through the network, e.g., in search for valuable data, further infiltration pathways (e.g., lists of login credentials); and exfiltration, during which sensitive or otherwise valuable data is transmitted from the organization to the attacker. Alternatively or additionally to the foregoing, the kill chain may include other stages, or sub-stages, depending on the particular type and goal of the attack; these (sub-)stages include, without limitation, weaponization (e.g., the creation of a malware payload), delivery (e.g., of the created malware as an email attachment or link) and exploitation (e.g., triggering of the malware code once delivered); installation (e.g., of a "backdoor" that allows persistent access following the initial penetration); persistence, privilege escalation, defense evasion, and credential access to solidify access to the network (e.g., using account and access token manipulation, logon scripts, permissions modifications, etc.); discovery (e.g., of further information about the computer network, such as, e.g., of accounts, password policies, software and processes, system network configurations, etc.); collection (e.g., audio and screen capture, collection of clipboard data, emails, etc.); command and control (e.g., communications with the attacker outside the network that indirectly provide full control access within the network); and/or any actions on the ultimate objective (e.g., apart from data theft, data destruction, sabotage via viruses, etc.). Along the kill chain, multiple different types of actions may take place and affect multiple machines, users, applications, data repositories, and so on. The clustering component 120 may serve to aggregate security alerts 122 triggered at various stages of a given attack into a single incident 124, which, in addition to cutting down on the number of items to be reviewed, provides human administrators and automated mitigation tools alike with a more holistic view of the attack, and thus the potential ability to respond more comprehensively and appropriately.

The clustering of security alerts 122 by the clustering component 120 may be accomplished in various ways. Alerts 122 may, for instance, be grouped together based on a set of heuristic rules that capture commonalities or patterns expected for the alerts 122 associated with a given attack, such as a common message text between multiple emails, or a certain sequence of actions carried out when a given item of malware is executed. Alternatively or additionally, the alerts 122 may be computationally represented as the nodes of a graph, with edges corresponding to shared attributes (e.g., the same affected machine or user) or similar relationships (e.g., a network communication that triggered both alerts) between any pair of nodes, and a clustering algorithm may then operate on the graph to identify clusters of alerts, where the clusters are generally characterized by higher connectivity between nodes within each cluster as compared to the connectivity between different clusters. Alerts may be clustered in batches (e.g., corresponding to certain time windows during which the alerts have been collected), or on an ongoing basis using continuous or periodic updates to an existing set of clusters, or with some combination of both. The clustering component 120 may be or include one or more statistical models and/or machine-learning models, which may be trained and/or retrained, e.g., using administrator feedback. Suitable clustering algorithms and machine-learning models (including methods of training them) are known to those of ordinary skill in the art. In some embodiments, the clustering component 120 is implemented in whole or in part using a hardware accelerator (e.g., a field-programmable gate array (FPGA) or application-specific integrated circuit (ASIC)).

The security incidents 124 output by the clustering component 120 may, in principle, be directly reported to a security administrator or operated on automatically for mitigating action. In various embodiments, however, an intervening ranking and/or filtering step is performed by the prioritization component 126 to either reduce the security incidents 124 in number or order them based on priority. In this manner, the attention of human security administrators and/or the computational resources allocated to automated risk mitigation, as the case may be, can be devoted to the most pressing security threats first. As explained in more detail below, the prioritization component 126 measures a degree of diversity of the security alerts 122 within each incident 124 based on attributes of the alerts (such as, e.g., the stage within the kill stage or the number of machines affected), and then orders or filters the incidents 124 by the determined diversity scores, i.e., values of the diversity metric 128. In general, security incidents 124 with a higher degree of diversity are ranked higher, reflecting the notion that they are likely the more interesting (or threatening) cases. A high diversity score associated with a security incident 124 may, for instance, be an indication of widespread penetration of the computer network 100, which renders the incident 124 particularly dangerous or damaging, and/or of a high level of sophistication of the attack, which may reduce the effectiveness of routine threat-mitigation techniques and warrant special attention. Security incidents 124 with low diversity scores may be retained farther down on the ranked list of incidents 124, or filtered out altogether, e.g., if the diversity score falls below a specified threshold.

The ranked and/or filtered security incidents 124 are passed from the prioritization component 126 to the reporting component 130 and/or the mitigation component 134. The reporting component 130 may include a user interface, e.g., in the form of an interactive console, that provides an ordered list of security incidents 124 for review by a user 132, and allows the user 132 to select individual incidents 124 for a more in-depth examination of the constituent security alerts 122 and the associated collected data. Alternatively or additionally, the reporting component 130 may send notifications of high-priority incidents 124, such as, e.g., the top ten incidents on any given day, or any incidents that exceed a certain diversity threshold, to the user 132 via email, text, or in some other form. The mitigation component 134 may process incidents 124 automatically and/or upon user initiation, such as based on user selection of an action, e.g., in the console of the reporting component 130, and communication of the selection from the reporting component 130 to the mitigation component 132. When triggered automatically, mitigating actions may be selected, e.g., based on an automated analysis of data associated with the incident 124 (e.g., to determine the type of security breach, any malware involved, etc.), optionally in conjunction with a level of severity of the security breach as reflected in the diversity score. Whether taken automatically or initiated by a security administrator, mitigating actions may include, for example and without limitation: suspending network accounts, requiring that users reset their passwords, isolating affected machines, performing scans for viruses and other malware, de-installing identified malware, sending warnings (e.g., about phishing attacks or email attachments containing malware) to network users, backing up valuable information, increasing the level of network traffic monitoring, etc.

Figure 2:
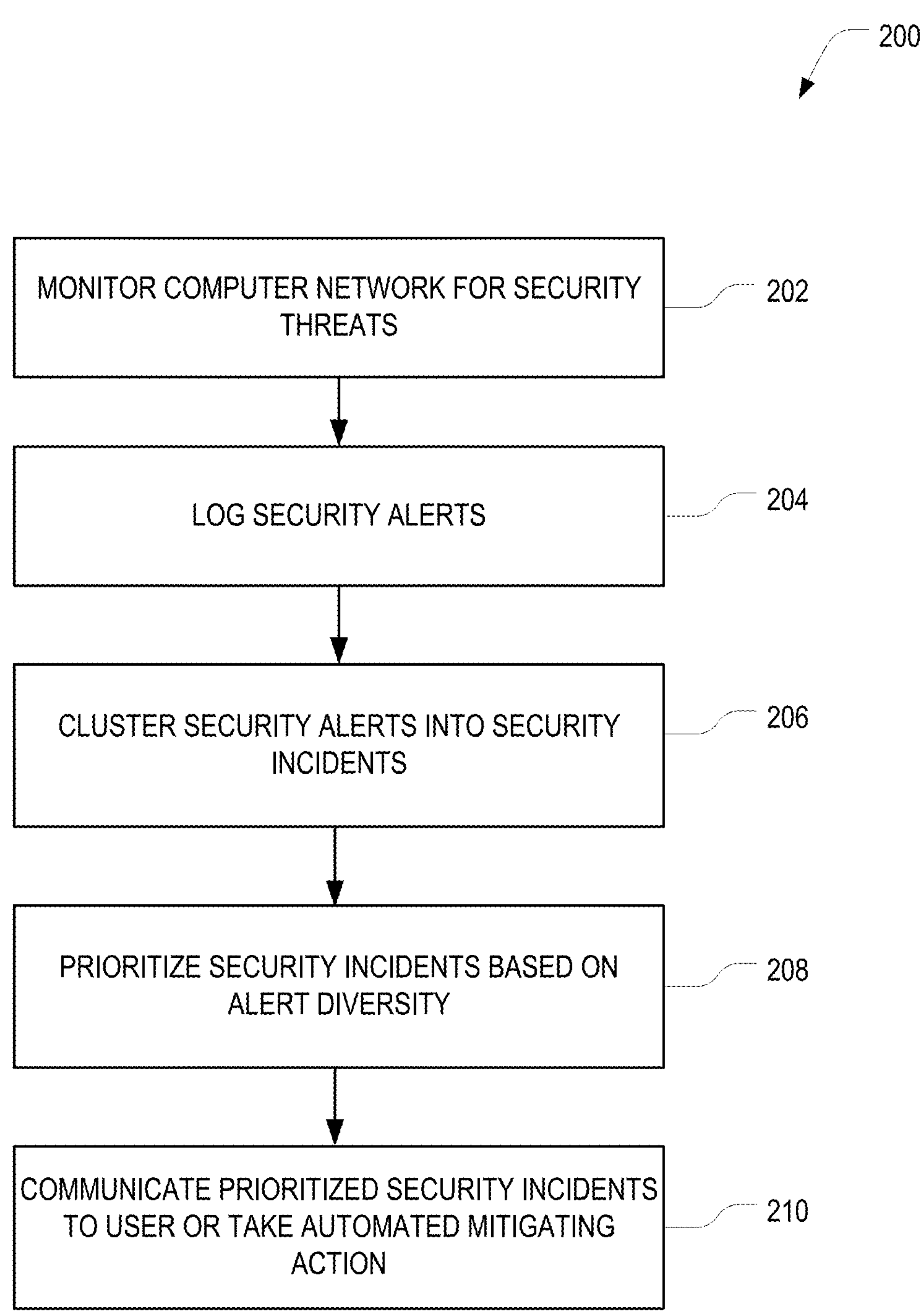
FIG. 2 is a flow chart of an example method of providing network security in a computer network, in accordance with various embodiments.

Turning now to FIG. 2, an example method 200 of providing network security in a computer network, in accordance with various embodiments, is illustrated in the form of a flow chart. The method 200 may be performed with, and the following description references by way of example, components of the computer network 100 shown in FIG. 1; it is to be understood, however, that execution of the method 200 is not limited to the particular network configuration of FIG. 1 described above.

As shown in FIG. 2, the method 200 begins, in act 202, with monitoring the computer network 100 for security threats (understood to include both potential and actual security breaches), e.g., using security tools and products 110-117 or the like. Whenever a threat is detected, a security alert is issued and logged, in act 204, e.g., by storing, for each alert, a data structure storing metadata that includes values of various attributes (meaning various types of information), for example and without limitation: a unique alert identifier (e.g., a counter or other number that is unique across all alerts triggered within a given time period), a timestamp (which, in conjunction with the alert identifier, uniquely identifies the alert in perpetuity), an identifier of the type of alert (e.g., a categorical alert title), an alert description (e.g., providing more general information about alerts of the identified type, and/or specific information about the particular alert), the stage of the alert within the cyberattack kill chain (e.g., whether the security alert is associated with reconnaissance, infiltration, lateral movement, exfiltration, etc.), a source of the alert (e.g., which tool or suite among multiple security products issued the alert), an identifier (or identifiers) of the involved user account(s) (or, if the alert is associated with communications between users, separate identifiers of the sender and recipient accounts), an identifier (or identifiers) of the involved machine(s) (or, if the alert is associated with network communications between machines, separate identifiers of the source and sender), an indicator whether the alert involves any foreign or suspicious program code, or any suitable combination of the foregoing attributes or others.

As will be understood by those of ordinary skill in the art, not every alert has all of the associated metadata items. For example, some alerts do not have a particular associated machine. In some instances, a logged alert includes merely an alert identifier and time stamp, and optionally further an alert title or type. A diversity metric as discussed herein is defined in terms of one or more attributes (types of information) that are common across the security alerts or at least some of the security alerts, as detailed below. For any such common attribute, the attribute values of different alerts may generally be different or the same. For a common attribute to be useful in assessing diversity, at least one of the alerts will differ in value from another one of the alerts.

In act 206, the security alerts 122 are grouped into security incidents 124, e.g., by clustering component 120. The grouping may be based on the above-referenced attributes, and may utilize rules and/or clustering algorithms as described above. For each security incident 124, a data structure including a listing of all the security alerts 122 within the incident 124 may be stored in computer memory. Different incidents 124 include different subsets of the security alerts 122. The subsets may be disjoint in some embodiments. However, the clustering may also allow for overlap between the subsets, resulting from one or more alerts being assigned to multiple incidents 124. Two different subsets may, but need not, differ in the number of security alerts 122 they contain.

Even with alerts 122 sorted into incidents 124, security analysts may face a nearly endless queue of incidents 124, and will generally benefit from an indication which incidents should be investigated first. Similarly, the allocation of machine resources to process incidents would benefit from knowledge of the relative levels of severity of the threats. Therefore, in act 208, the security incidents 124 are prioritized. Such prioritization can be achieved by accessing data associated with each incident to computationally evaluate a common diversity metric 128 for each incident 124 (the same metric for all incidents 124), and then ranking the incidents 124 based on the computed values of the diversity metric 128 (the values of the common diversity metric generally differing between different incidents 124). The common diversity metric 128 is defined as a function of one or more common alert attributes, and measures a degree of security alert diversity within each incident 124 in terms of the alert attributes. That is, for a given security incident 124, the respective diversity metric value 128 is computed based on the corresponding attribute values associated with the respective subset of security alerts 122 of that incident 124. Different values (or diversity scores) for different incidents 124, accordingly, reflect different degrees of security alert diversity. The diversity scores and/or the resulting ranks may be stored in the data structures for the security incidents 124. Alternatively, the ranking may be stored in the form of a linked list of the security incidents 124. The prioritized security incidents 124, or at least a subset corresponding to a number of highest-ranking incidents 124, are then, in act 210, communicated to mitigation component 134 for automated mitigating action, and/or to a user (e.g., via reporting component 130) for further evaluation and initiation of mitigating action. This completes the method 200.

Figure 3:
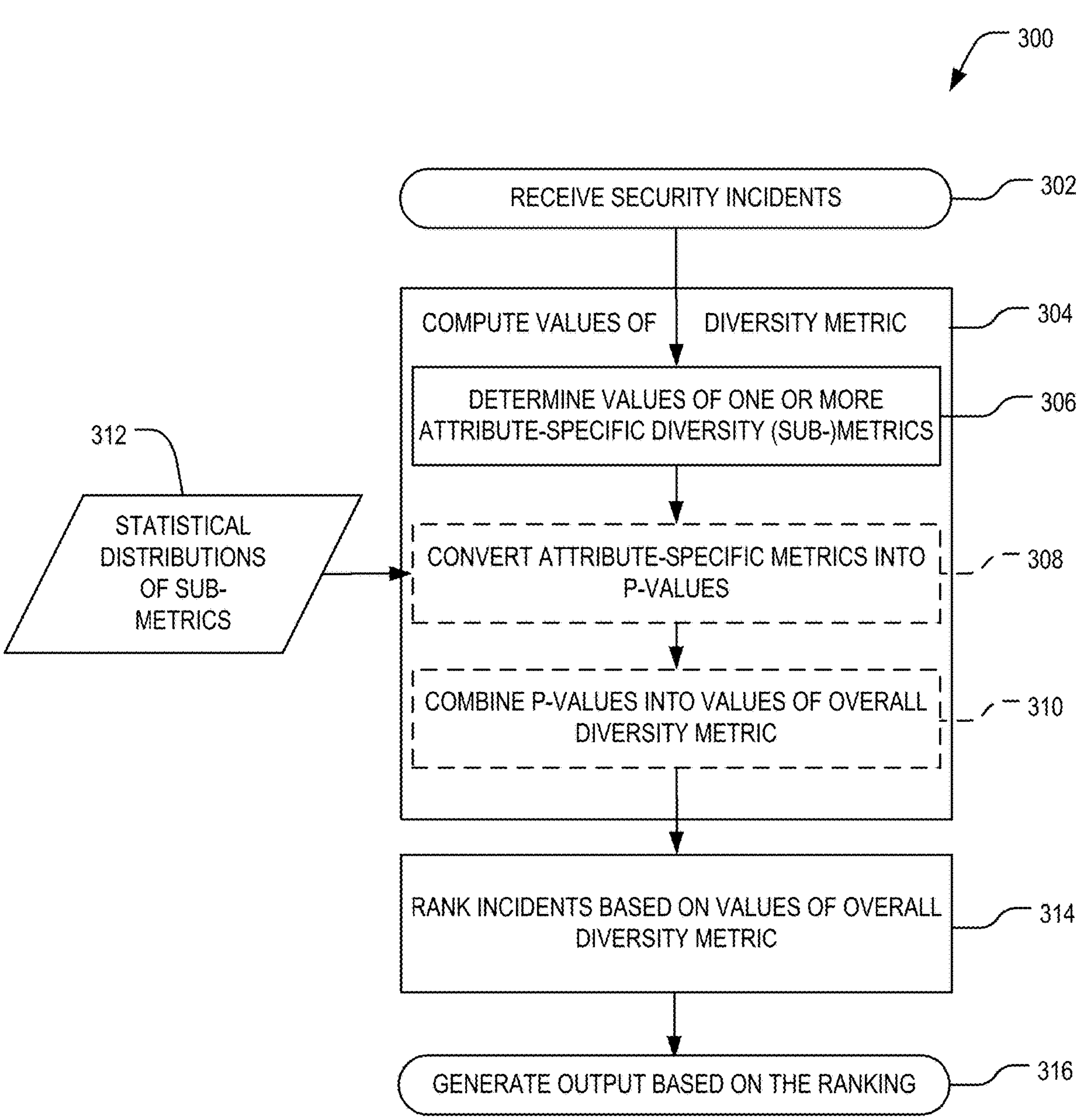
FIG. 3 is a flow chart of an example method of ranking security incidents based on alert diversity, in accordance with various embodiments.

FIG. 3 illustrates in more detail, in the form of a flow chart, an example method 300 of ranking security incidents 124 based on alert diversity (corresponding to act 208), in accordance with various embodiments, as may be performed, e.g., by the prioritization component 126 shown in FIG. 1. The method 300 begins, in act 302, with the receipt of security alerts 122 (including their attributes as logged in act 204) already grouped into incidents 124. In act 304, values of a diversity metric are computed for the incidents 124 based on one or more common attributes associated with the security alerts 122 within each incident 124. A common attribute is an attribute for which some or all of the security alerts 122 (across incidents) store a respective attribute value, although the values themselves may differ between the security alerts 122.

In some embodiments, the diversity metric is or includes an entropy measure such as, e.g., the Shannon entropy, which is defined as:

$$S = -\sum P \log_2 P,$$

where, when measuring alert diversity within an incident, the sum is taken over all possible values of a given attribute, and P indicates the fraction of alerts 122 within the incident 124 that take the respective value (or optionally, if the attribute is common to fewer than all alerts 122 within the incident 124, the fraction of the alerts for which a value of the attribute is available, ignoring the alerts that do not possess a value of the attribute). To illustrate, consider a single security incident that includes five alerts, associated with the kill chain stages and affected machines listed in Table 1 below.

TABLE 1

| Alert | Kill chain stage | Affected machine |
|---|---|---|
| 1 | Infiltration | 1 |
| 2 | Lateral movement | 2 |
| 3 | Exfiltration | 2 |
| 4 | Exfiltration | 1 |
| 5 | Infiltration | 2 |

Measuring alert diversity in terms of the kill chain stages associated with the alerts, the Shannon entropy would evaluate to:

$$\begin{aligned} S_{kill} &= -P_{infiltration}\log_2(P_{infiltration}) - P_{lateral}\log_2(P_{lateral}) - P_{exfiltration}\log_2(P_{infiltration}) \\ &= -\frac{2}{5}\log_2\frac{2}{5} - \frac{1}{5}\log_2\frac{1}{5} - \frac{2}{5}\log_2\frac{2}{5} \approx 1.522 \end{aligned}$$

Measuring alert diversity in terms of the diversity of affected machines, the Shannon entropy would evaluate to:

$$S_{machines} = -P_1\log_2(P_1) - P_2\log_2(P_2) = -\frac{2}{5}\log_2\left(\frac{2}{5}\right) - \frac{3}{5}\log_2\left(\frac{3}{5}\right) \approx 0.971$$

For comparison, consider a second incident with a distribution of kill chain stages and affected machines as listed in Table 2:

TABLE 2

| Alert | Kill chain stage | Affected machine |
|---|---|---|
| 1 | Infiltration | 1 |
| 2 | Exfiltration | 1 |
| 3 | Exfiltration | 1 |
| 4 | Exfiltration | 1 |
| 5 | Exfiltration | 1 |

For this second incident, the Shannon entropy in terms of kill chain stages evaluates to $$S_{kill} = -\frac{4}{5}\log_2\frac{4}{5} - \frac{1}{5}\log_2\frac{1}{5} = 0.722,$$

and the Shannon entropy in terms of affected machines evaluates to $S_{machines} = -\log_2 1 = 0$, indicating the lower degree of diversity of the security alerts in the second incident in their attributes.

Entropy measures such as the Shannon entropy or its generalization, the Renyi entropy, measure the diversity of the attribute distribution of the security alerts in an incident, but are inherently normalized with respect to the total number of alerts. Thus, two incidents with vastly different numbers of alerts that share the same distribution of attribute values will have the same entropy value. In order to prioritize incidents with greater numbers of alerts, various embodiments therefore utilize, as the diversity metric D, the product of the number of alerts and the entropy of their attribute distribution: $D = N_{alerts} \cdot S$. Further, as will be appreciated by those of ordinary skill in the art, other diversity metrics may be used in place of an entropy measure. Suitable such metrics may be found, e.g., in information theory (an example being the Kolmogorov complexity) or borrowed from studies of biodiversity (examples including the Simpson and Berger-Parker indexes). Additional suitable metrics, whether currently known or in the future developed, may occur to those of ordinary skill in the art.

In some embodiments, the diversity metric is computed based on the attribute values of multiple attributes associated with the alerts. For instance, as shown in FIG. 3, values of attribute-specific sub-metrics for multiple attributes (e.g., kill chain stage, the source of the alert, the machine identifier of the affected machine, the user identifier of the affected user, or the type or title of alert) may first be determined for each incident, in act 306, and the various sub-metrics may then be combined into an overall diversity metric 128 (e.g., using acts 308, 310). The attribute-specific sub-metrics may be or include, e.g., entropies $S_{kill}$, $S_{machines}$ as described above and/or similarly defined entropies for other attributes, optionally multiplied by the number of alerts 122 within the incident 124. The overall diversity metric 128 may be computed in various ways, for instance, as some algebraic combination (e.g., product, sum, or weighted sum) of the attribute-specific sub-metrics. Alternatively, the attribute-specific sub-metric may be combined using p-values, which may serve to render the values of different attribute-specific sub-metrics comparable notwithstanding the drastically different numbers of values that different attributes can take (e.g., with the kill chain stage taking one of on the order of ten values, and machines and users each taking one of on the order of hundreds, thousands, or tens of thousands of values).

When using p-values, as depicted in FIG. 3, the attribute-specific sub-metrics may first be converted to p-values, in act 308, and the p-values may then be combined into the overall diversity metric, in act 310. The p-value for a given value of the sub-metric is the statistical probability, given a statistical distribution of the sub-metric, that the sub-metric equals or exceeds the given value. Accordingly, converting an attribute-specific sub-metric into a p-value takes knowledge of the statistical distribution 312 of the values of the attribute-specific sub-metric as input. That statistical distribution 312 for each attribute-specific sub-metric may be determined empirically, e.g., evaluating the sub-metric for many incidents over a period of time and then generating a histogram of the computed values of the sub-metric. Alternatively, the statistical distribution 312 may be modeled theoretically, e.g., based on heuristics and assumptions about the expected values of the sub-metric. It is also possible to use some combination of modeling and empirical data to determine the statistical distribution 312. The statistical distribution 312 may be stored in computer memory, e.g., as part of or accessible by the prioritization component 126.

Given a certain expected distribution 312 of values of the sub-metric, if any given measured value of the sub-metric falls on the far right tail of the distribution 312, that indicates that a value that high is statistically unlikely (has a low p-value), or in other words, that the degree of alert diversity in terms of the attribute for which the sub-metric is being computed is unusually high. Incidents with low p-values should, therefore, be given high priority. (This relationship holds if higher values of the sub-metric correspond to a greater degree of diversity, as is the case for the entropy measure defined above. If the sub-metric is instead defined such that it assumes lower values for greater levels of diversity, the p-value corresponds to the probability that the degree of diversity is no higher than that associated with the given value of the sub-metric, and incidents with low p-value should be given low priority. In this case, the overall diversity metric may be computed from p-value complements of 1, i.e., 1 minus the p-value.)

In act 310, the p-values derived from the individual sub-metrics for an incident 124 are combined into the value of the overall diversity metric 128 for the incident. The overall diversity metric 128 may, for instance, be or include a weighted sum of logarithms of the p-values for the multiple attributes. The weights are, in some embodiments, determined heuristically or empirically, e.g., based on feedback to the ranking of incidents 124 provided by security analysist. A special case of a logarithm-based combination of p-values is known in the art as Fisher's method, which combines the p-values $p_i$ computed from the values of k sub-metrics (corresponding to k attributes) according to $$X^2 = 2\sum_{i=1}^{k} \ln p_i.$$

Alternatively, the p-values may be combined using Stouffer's method, which computes, from the p-values, Z-scores $Z_i = \Phi^{-1}(1-p_i)$, where φ is the standard normal cumulative distribution function, and then combines the individual Z-scores into an overall score $$Z \sim \frac{\sum_{i=1}^{k} Z_i}{\sqrt{k}}$$

or overall weighted score $$Z \sim \frac{\sum_{i=1}^{k} w_i Z_i}{\sqrt{\sum_{i=1}^{k} W_i}}.$$

For both Fisher's method and Stouffer's method, the resulting scores ($X^2$ or Z) follow a particular distribution, allowing the determination of "honest" p-values, meaning p-values drawn from the uniform distribution. Other data fusion methods known in the field of statistics may also be employed.

Following computation of the overall diversity metric 128 (which may be either a single attribute-specific metric or a combination of multiple attribute-specific metrics) for each incident 124 in act 304, the incidents 124 can be ranked based on the values of the overall diversity metric 128 in act 314. An output is then generated, in turn, based on that ranking, in act 316. The output may be or include an automated mitigating action, e.g., as performed by the mitigating component 132, and/or a visual or textual output presented to a user, or some other form of communication, as may be provided by the reporting component 130. In some circumstances, in addition to ordering the incidents 124 from most to least interesting, the generated output may include or be based on a quantitative assessment as to the importance of a security incident 124, such as, e.g., an indication that a particular incident is in the top 1% most interesting incidents detected over some period of time or since inception of diversity-based ranking of incidents 124 in the organization.

The method 300 provides an approach to prioritizing incidents 124 based on how diverse, or not compressible, they are in a variety of factors as captured in the attributes of their constituent security alerts 122, combining multiple factors, where applicable, into one final ordering of incidents 124. Beneficially, this method is robust to many available types of metadata, and does not depend on explicitly determining severity or true positive rate. Instead of spending time and resources on incidents that, though likely true positives, are less important, the diversity-based approach focuses on incidents that, if true, are potentially devastating. Empirically, it has been found that this approach indeed identifies incidents of practically high importance, as it is well-suited to capturing the scope of the incident in terms of relevant parameters (such as numbers of affected users and machines). The technical effect of the disclosed method of ranking incidents is, thus, to increase the efficiency of processing security incidents, which can entails savings in machine resource usage.

Figure 4:
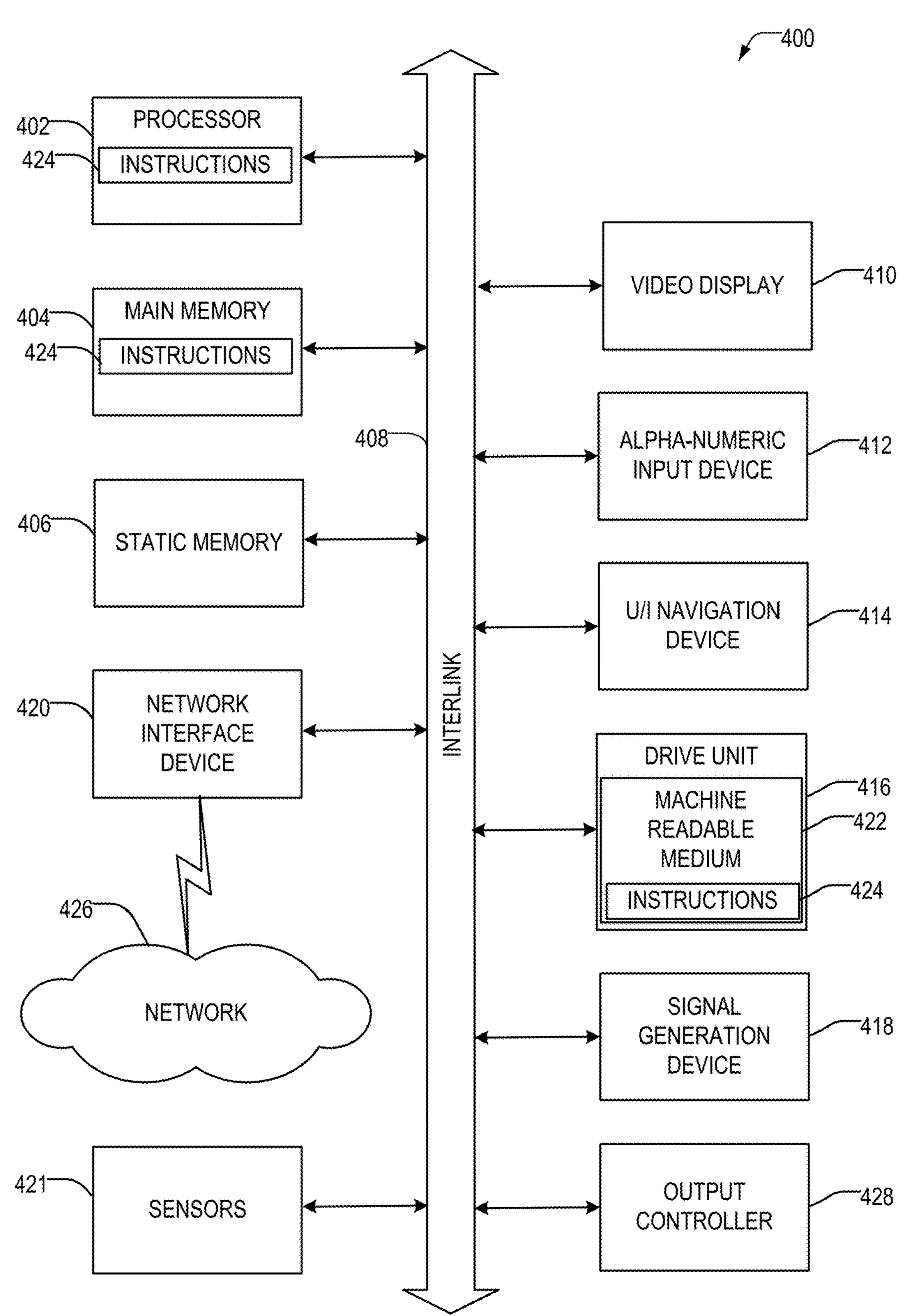
FIG. 4 is a block diagram of an example machine that may perform any one or more of the methods discussed herein.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a smartphone, a web appliance, a network router, switch or bridge, a server computer, a database, conference room equipment, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. In various embodiments, machine(s) 400 may perform one or more of the processes described above with respect to FIGS. 2 and 3 above. For example, within the computer network 100 of FIG. 1, one or more machines 400 may implement any of computing machines 102, 104, 106, any of the security tools 110-117 for generating security alerts, and/or any of the components 120, 126, 130, 134 for processing the security alerts.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The storage device 416 may include a machine-readable medium 422 on which are stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine readable media. In some examples, machine-readable media may include machine-readable media that are not a transitory propagating signal.

The instructions 424 may further be transmitted or received over a communications network 426 using a transmission medium via the network interface device 420. The machine 400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The following numbered examples are illustrative embodiments.

Example 1 is a computer-implemented method for prioritizing a plurality of security incidents. The method includes a number operations performed by at least one hardware processor. The operations include accessing data associated with the plurality of security incidents, each security incident comprising a different subset of a plurality of security alerts issued in a computer network. The plurality of security alerts have one or more common associated attributes, and at least one of the plurality of security alerts differs in an attribute value of the common attribute(s) from another one of the plurality of alerts. The operations further include computing a diversity metric value representing a degree of security alert diversity within each incident with a diversity metric defined as a function of the at least one common attribute, based on corresponding attribute values associated with the respective subset of security alerts of the security incident. Further, the operations include prioritizing the plurality of security incidents based on the diversity metric values, and generating an output based on the prioritizing.

Example 2 is the computer-implemented method of example 1, wherein prioritizing the plurality of security incidents includes ranking or filtering the plurality of security incidents based on the diversity metric values, and wherein generating the output includes communicating a subset of the plurality of security incidents to a user, the subset being selected based on the ranking or filtering.

Example 3 is the computer-implemented method of example 1 or example 2, wherein prioritizing the plurality of security incidents comprises ranking or filtering the plurality of security incidents based on the diversity metric values, and wherein generating the output includes taking an automated mitigating action on a subset of the plurality of security incidents, the subset selected based on the ranking or filtering.

Example 4 is the computer-implemented method of any of examples 1-3, wherein the diversity metric comprises an entropy corresponding to a function of at least one of the one or more common attributes.

Example 5 is the computer-implemented method of any of examples 1-4, wherein the diversity metric is defined as a function of multiple common attributes associated with the security alerts.

Example 6 is the computer-implemented method of example 5, wherein the multiple common attributes include two or more of the following: an alert title, a kill chain stage, a source of the security alert, a machine identifier of a machine affected by the security alert, or a user identifier of a user affected by the security alert.

Example 7 is the computer-implemented method of example 5 or example 6, wherein computing the diversity metric value for each of the plurality of security incidents includes: determining, for each of the multiple common attributes, a value of an attribute-specific sub-metric measuring a degree of security alert diversity within the security incident with respect to the common attribute; and determining the diversity metric value for the security incident based on the values of the attribute-specific sub-metrics.

Example 8 is the computer-implemented method of example 7, wherein determining the diversity metric values based on the values of the attribute-specific sub-metrics includes, for each of the plurality of security incidents: converting, for each of the multiple common attributes, the determined value of the attribute-specific sub-metric into a p-value based on a modeled or empirically determined statistical distribution of the attribute-specific sub-metric; and combining the p-values for the multiple common attributes into the diversity metric value for the security incident.

Example 9 is the computer-implemented method of example 8, wherein the diversity metric value comprises a weighted sum of logarithms of the p-values for the multiple common attributes.

Example 10 is the computer-implemented method of example 8, wherein the p-values are combined using Stouffer's method.

Example 11 is the computer-implemented method of any of examples 8-10, wherein at least one of the attribute-specific sub-metrics comprises an entropy defined as a function of the corresponding common attribute.

Example 12 is the computer-implemented method of example 11, wherein the at least one of the attribute-specific sub-metrics comprises the entropy multiplied by a total alert count for the security incident.

Example 13 is a computer system including one or more hardware processors and one or more hardware memories storing instructions that, when executed by the one or more hardware processors, configure the one or more hardware processors to perform operations for prioritizing a plurality of security incidents. The operations include accessing data associated with the plurality of security incidents, where each security incident includes a different subset of a plurality of security alerts issued in a computer network. The plurality of security alerts have one or more common associated attributes, and at least one of the plurality of security alerts differs in an attribute value of one or more common attributes from another one of the plurality of alerts. The operations further include using a diversity metric defined as a function of the one or more common attributes to compute, for each of the plurality of security incidents, and based on corresponding attribute values associated with the respective subset of security alerts of the security incident, a respective diversity metric value representing a degree of security alert diversity within the incident. Further, the operations include prioritizing the plurality of security incidents based on the diversity metric values, and generating an output based on the prioritizing.

Example 14 is the computer system of example 13, wherein prioritizing the plurality of security incidents comprises ranking or filtering the plurality of security incidents based on the diversity metric values, and wherein generating the output includes communicating a subset of the plurality of security incidents to a user, and/or taking an automated mitigating action on at least a subset of the plurality of security incidents, the subset being selected based on the ranking or filtering.

Example 15 is the computer system of example 13 or example 14, wherein the diversity metric includes an entropy corresponding to a function of at least one of the one or more common attributes.

Example 16 is the computer system of any of examples 13-15, wherein the diversity metric is defined as a function of multiple common attributes associated with the security alerts; and wherein computing the diversity metric value for each of the plurality of security incidents includes: determining, for each of the multiple common attributes, a value of an attribute-specific sub-metric measuring a degree of security alert diversity within the security incident with respect to the common attribute; and determining the diversity metric value for the security incident based on the values of the attribute-specific sub-metrics.

Example 17 is the computer system of example 16, wherein the multiple common attributes include two or more of the following: an alert title, a kill chain stage, a source of the security alert, a machine identifier of a machine affected by the security alert, or a user identifier of a user affected by the security alert.

Example 18 is the computer system of any of examples 13-17, where the operations further include clustering the security alerts into security incidents based on the attribute values of the one or more common attributes associated with the security alerts.

Example 19 is the computer system of any of examples 13-18, where the operations further include monitoring the computer network for security threats, and generating the security alerts in response to detection of the security threats.

Example 20 is a non-transitory computer-readable storage medium including instructions that when executed configure hardware processing circuitry to perform operations for prioritizing a plurality of security incidents. The operations include accessing data associated with the plurality of security incidents, where each security incident includes a different subset of a plurality of security alerts issued in a computer network. The plurality of security alerts have one or more common associated attributes, and at least one of the plurality of security alerts differs in an attribute value of one or more common attributes from another one of the plurality of alerts. The operations further include using a diversity metric defined as a function of the one or more common attributes to compute, for each of the plurality of security incidents, and based on corresponding attribute values associated with the respective subset of security alerts of the security incident, a respective diversity metric value representing a degree of security alert diversity within the incident. Further, the operations include prioritizing the plurality of security incidents based on the diversity metric values, and generating an output based on the prioritizing.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings, which form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A computer-implemented method for prioritizing security incidents corresponding to different respective subsets of a set of security alerts issued in a computer network, the method comprising operations, performed by at least one hardware processor, comprising:

representing the security alerts with respective data structures comprising unique alert identifiers along with attribute values of at least one attribute that is common across at least some of the security alerts, at least one of the security alerts differing in an attribute value of the at least one attribute from another one of the security alerts;

evaluating a common diversity metric for the security incidents to determine respective diversity metric values for the security incidents, wherein the diversity metric values for the security incidents represent degrees of diversity of the attribute values of the security alerts within the respective subsets of the set of security alerts and depend at least on numbers of distinct attribute values within the respective subsets;

prioritizing the security incidents based on the diversity metric values; and generating an output based on the prioritizing.

2. The computer-implemented method of claim 1, wherein prioritizing the security incidents comprises ranking or filtering the security incidents based on the diversity metric values, and wherein generating the output comprises communicating a subset of the security incidents to a user, the subset selected based on the ranking or filtering.

3. The computer-implemented method of claim 1, wherein prioritizing the security incidents comprises ranking or filtering the security incidents based on the diversity metric values, and wherein generating the output comprises taking an automated mitigating action on a subset of the security incidents, the subset selected based on the ranking or filtering.

4. The computer-implemented method of claim 1, wherein the diversity metric comprises an entropy corresponding to a sum, taken over possible attribute values of the at least one attribute, of a function of fractions of the security alerts that take the respective values.

5. The computer-implemented method of claim 1, wherein the at least one attribute comprises multiple attributes that are common across at least some of the security alerts.

6. The computer-implemented method of claim 5, wherein the multiple attributes include at least two of an alert title, a kill chain stage, a source of the security alert, a machine identifier of a machine affected by the security alert, or a user identifier of a user affected by the security alert.

7. The computer-implemented method of claim 5, wherein determining respective diversity metric values for the security incidents comprises:

determining, for the multiple attributes, values of respective attribute-specific sub-metrics measuring respective degrees of diversity of the corresponding attribute values of the security alerts; and determining the diversity metric values for the security incidents based on the values of the attribute-specific sub-metrics.

8. The computer-implemented method of claim 7, wherein determining the diversity metric values of the security incidents based on the values of the attribute-specific sub-metrics comprises:

converting the determined values of the attribute-specific sub-metrics into p-values based on respective modeled or empirically determined statistical distributions of the attribute-specific sub-metrics; and combining the p-values for the multiple attributes.

9. The computer-implemented method of claim 8, wherein the diversity metric values of the plurality of security incidents comprise weighted sums of logarithms of the p-values for the multiple attributes.

10. The computer-implemented method of claim 8, wherein the p-values are combined using Stouffer's method.

11. The computer-implemented method of claim 8, wherein at least one of the attribute-specific sub-metrics comprises an entropy.

12. The computer-implemented method of claim 11, wherein the at least one of the attribute-specific sub-metrics comprises the entropy multiplied by a total alert count.

13. A computer system, comprising:

at least one hardware processor; and at least one hardware memory storing instructions that, when executed by the at least one or more hardware processor, configure the at least one hardware processor to perform operations for prioritizing security incidents corresponding to different respective subsets of a set of security alerts issued in a computer network, the operations comprising:

representing the security alerts with respective data structures comprising unique alert identifiers along with attribute values of at least one attribute that is common across at least some of the security alerts, at least one of the security alerts differing in an attribute value of the at least one attribute from another one of the security alerts;

evaluating a common diversity metric for the security incidents to determine respective diversity metric values for the security incidents, wherein the diversity metric values for the security incidents represent degrees of diversity of the attribute values of the security alerts within the respective subsets of the set of security alerts and depend at least on numbers of distinct attribute values within the respective subsets;

ranking or filtering the security incidents based on their respective diversity metric values; and selecting, based on the ranking or filtering, a subset of the security incidents for at least one of communication to a user or automated mitigating action.

14. The computer system of claim 13, wherein the diversity metric comprises an entropy corresponding to a sum, taken over possible attribute values of the at least one attribute, of a function of fractions of the security alerts that take the respective values.

15. The computer system of claim 13, wherein the at least one attribute comprises multiple attributes that are common across at least some of the security alerts.

16. The computer system of claim 15, wherein determining respective diversity metric values for the security incidents comprises:

determining, for the multiple attributes, values of respective attribute-specific sub-metrics measuring respective degrees of diversity of the corresponding attribute values of the security alerts; and determining the diversity metric values for the security incidents based on the values of the attribute-specific sub-metrics.

17. The computer system of claim 16, wherein the multiple attributes include at least two of an alert title, a kill chain stage, a source of the security alert, a machine identifier of a machine affected by the security alert, or a user identifier of a user affected by the security alert.

18. The computer system of claim 13, the operations further comprising:

clustering the security alerts into security incidents based on the attribute values of the at least one attribute.

19. The computer system of claim 18, the operations further comprising:

monitoring the computer network for security threats; and generating the security alerts in response to detection of the security threats.

20. A non-transitory computer-readable storage medium comprising instructions that when executed configure hardware processing circuitry to perform operations for prioritizing security incidents corresponding to different respective subsets of a set of security alerts issued in a computer network, the operations comprising:

representing the security alerts with respective data structures comprising unique alert identifiers along with attribute values of attributes that are common across at least some of the security alerts, at least one of the security alerts differing in an attribute value of at least one of the attributes from another one of the security alerts;

determining values of attribute-specific sub-metrics for the security incidents, the attribute-specific sub-metrics representing degrees of diversity of the attribute values of the security alerts within the respective subsets of the set of security alerts that correspond to the security incidents and depend at least on numbers of distinct attribute values within the respective subsets;

determining values of a diversity metric for the security incidents based on the values of the attribute-specific sub-metrics;

prioritizing the plurality of security incidents based on the values of the diversity metric; and generating an output based on the prioritizing.

* * * * *